Oct. 5, 1943.    O. H. DICKE    2,331,267

TIME INDICATING SYSTEM

Filed April 2, 1930

A.C. Voltage

A.C. Current

Flux in Teeth

INVENTOR
O. H. Dicke

Patented Oct. 5, 1943

2,331,267

UNITED STATES PATENT OFFICE 2,331,267

TIME INDICATING SYSTEM

Oscar H. Dicke, Rochester, N. Y.

Application April 2, 1930, Serial No. 441,109

27 Claims. (Cl. 58—24)

This invention relates to time indicating systems, and more particularly to systems where time indicating devices are regulated over the usual light and power distributing network, and is an improvement over my prior Patent No. 2,248,165, granted July 8, 1941.

It has been experienced that it is entirely practical to govern the generating units of an alternating current distributing system so that synchronous motor driven clock hands keep correct time. It has on the other hand also been experienced that it is quite common for one power distributing circuit to be cut-out for a minute or two due to the automatic opening of a circuit breaker in response to a lightning disturbance or the like, so that the synchronous motor clocks on that particular distributing circuit will be slow or behind clocks on other circuits to that extent.

In accordance with the present invention it is proposed to employ a spring driven clock and add suitable means to vary the force exerted to operate the clock in accordance with the degree or extent the clock is ahead or behind the time as determined by cycle counting of the current impulses of a properly governed alternating current power system.

More specifically it is proposed to employ a synchronous motor to help or oppose the usual main spring of the usual balance wheel escapement movement, so that the clock hands are, as a matter of fact, regulated by the synchronous motor as long as this motor is supplied with alternating current, but are operated wholly by the main spring, and escapement, upon power failure. Also, in accordance with the present invention, by reason of the fact that a synchronous motor has a constant speed and an escapement has an irregular speed, it is proposed to include a suitable yieldable driving connection between the synchronous motor and the escapement.

Another object of the present invention is to construct a synchronous motor of the toothed wheel type, so that high flux density in its teeth and poles is only present during a very small part of a current wave even though the voltage of the source has practically a sine wave characteristic.

Another purpose of the present invention, as exemplified in the drawing, is to actuate the escapement pallet or the pendulum of a clock by means controlled synchronously by the alternating current.

Other objects, purposes and characteristic features of the invention will be pointed out hereinafter, and will in part be obvious from the accompanying drawing.

In describing the invention in detail reference may be had to the accompanying drawing in which.

Figure 1:
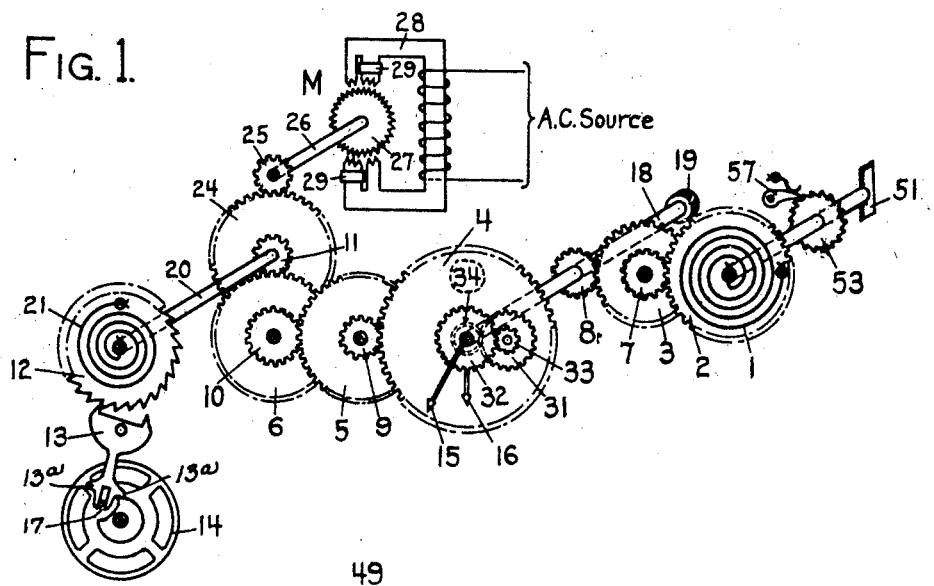
Fig. 1 shows one form of the invention, in which the synchronous motor is rigidly coupled to the spring driven gear train.

Referring to Fig. 1 of the drawing the main spring 1, wound by a winder 51 the gears, 2, 3, 4, 5 and 6, driving pinions 7, 8, 9, 10 and 11, respectively, the escapement wheel 12, the escapement pawl 13, the balance wheel 14 and its associated hair spring (not shown), and the clock hands 15 and 16, adapted to be set by knob 19 through the medium of the usual frictional connection, constitute the usual elements of an escapement clock. These parts cooperate in the usual way, to cause the hands 15 and 16 to indicate substantially correct time, except that in the structure shown the escapement wheel 12 is free to rotate on the shaft 20, but is driven by this shaft 20 through the medium of the hair spring 21. The purpose of this hair spring 21 will be pointed out hereinafter. The pinion 11 in addition to being driven by the gear 6 is also driven by the gear 24 fastened directly thereto, which gear 24 is driven by a pinion 25 on the shaft 26 of the synchronous motor M. The gear ratio between the motor shaft 26 and the minute wheel 4 (rotating 1 R. P. H.) is such that the minute wheel 4 keeps correct time when the alternating current applied to the motor M is maintained at an average frequency of 60 cycles through each second of time elapsed. The frequency may be so maintained by having a suitable synchronous motor driven clock operated off of the bus-bar at the power generating plant and regulating the frequency to keep said synchronous motor driven clock in correspondence with U. S. naval observatory time. Any other suitable frequency may of course be used.

The rotor 27 of the motor M has a large number of projecting teeth, the number of teeth being properly chosen in connection with the gear ratio to cause the clock hands to indicate correct time, and the rotor is operated one tooth per wave or two teeth per cycle of alternating current. It will be noted that the laminated field 28 has its poles bifurcated to constitute two large and two small poles, the large poles of which contain shading coils 29, so as to cause the flux passing through these latter poles to lag behind the flux of the small poles, and thereby produce alternate attraction on the teeth of the rotor so that four distinctive pulls per cycle are produced on the rotor.

Figure 2:
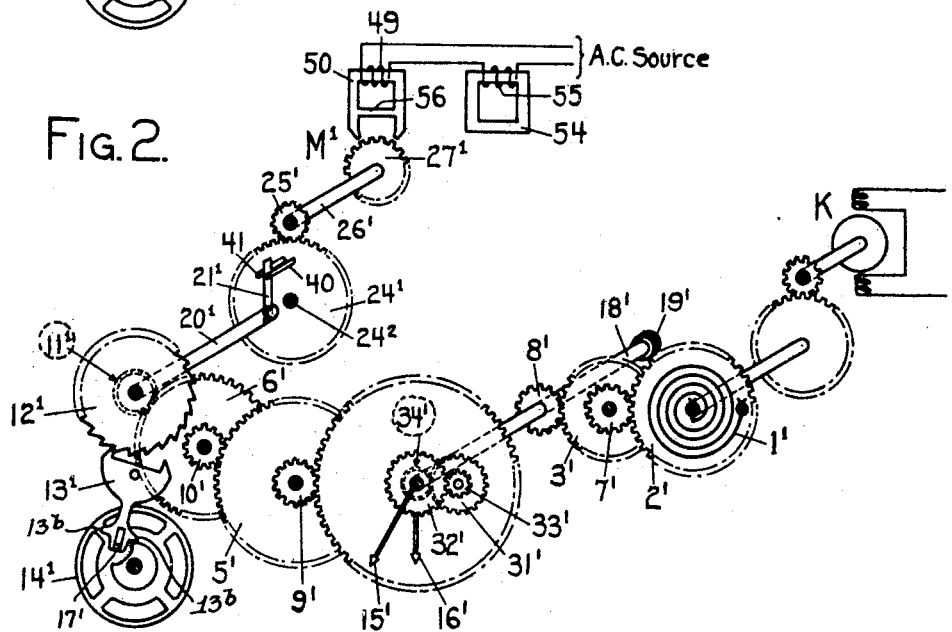
Fig. 2 shows a modified form in which the synchronized motor is coupled to the spring driven gear train through yieldable means.

The motor M in practice has sufficient power to accelerate or decelerate the escapement 12—14 to cause the clock hands 15 and 16, connected through reduction gears 31 and 32 driven by pinions 33 and 34, to keep correct time, and in the case of power failure the rotor 27 is driven by the main spring 1. This main spring is of course rewound when required, either by hand, as by the winder 51, or by a motor as shown in Fig. 2. It is of course now apparent that the hair spring 21 is employed to transmit a substantially constant torque from the shaft 20 operating at a constant speed to the escapement wheel 12 operating in step-by-step fashion.

A clock has thus been produced which keeps time in accordance with the rate at which alternating current cycles are received while power is available, and which keeps time in accordance with the accuracy of the escapement 12—14 during power failures. It is of course understood that the clock hands 15 and 16 may be set in the usual way the minute shaft 18 being frictionally held in the sleeve of the unitary structure comprising the gear 4 and the pinion 8.

Referring now to Fig. 2, the escapement clock mechanism is exactly the same as that shown in Fig. 1 except that the escapement wheel $12^1$ is connected fixedly to the shaft $20^1$, the hair spring 21 being omitted, and that the gear $24^1$ instead of being integral with the pinion $11^1$ is yieldingly connected thereto through the medium of the spring $21^1$, which is riveted in the slotted end of the shaft $20^1$ and projects between the two pins 40 and 41 contained in the gear $24^1$, mounted for free rotation on the stud $24^2$. Also, whereas the escapement clock of Fig. 1 is hand wound, as indicated by the key 51 and the ratchet 53 and pawl 57, the escapement clock of Fig. 2 is preferably automatically wound, as by an induction motor K suitably controlled or braked to keep the force exerted by the main spring $1^1$ at the desired value.

Although the synchronous motor $M^1$ shown in Fig. 2 may be of any suitable construction it is preferably of improved construction. As shown the motor $M^1$ comprises a toothed rotor $27^1$ having either pointed or dull teeth, and a stator 50 having projecting poles each having one or more teeth spaced to cooperate with the rotor teeth simultaneously.

Figure 3:
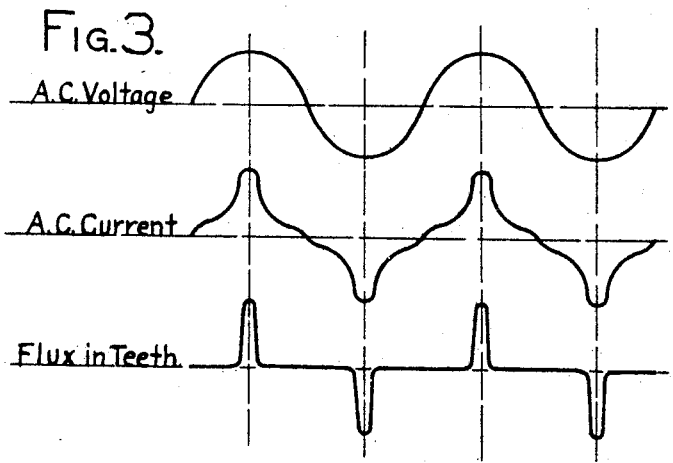
Fig. 3 shows graphs of the voltage and current flow, and the corresponding flux densities in the teeth of the synchronous motor shown in Fig. 2.

The stator or magnet 50 is provided with a coil 49, which is included in series with a reactor comprising the laminated iron core 54 on which is contained a coil 55. This reactor is of special importance, in that it not only limits the current flow but in that it also changes its wave shape. The cross-section of the core 54 and the number of turns in the coil 55 are so chosen that the core becomes saturated with flux before the voltage of the source, as illustrated (see "A. C. voltage") in Fig. 3, reaches the maximum value for which reason the current builds up suddenly near the middle of each current wave as illustrated in Fig. 3 (see "A. C. current"). As this magnetizing current now flows through the coil 49 the initial magnetism flows through the shunt or magnetic by-pass 56, but as the peaked portion of the current wave passed through the coil 49, the shunt 56 having become saturated causes flux in the rotor to build up suddenly to a high value at the middle of the flux wave, as shown by the curve (see "flux in teeth") in Fig. 3. It is of course understood that in the three curves illustrated in Fig. 3 time is plotted from left to right, whereas points above the horizontal line designate positive voltage, current or flux, and points below this line represent negative values of voltage, current or flux.

Attention is particularly directed to the manner in which magnetism of special wave form is derived from a sine wave voltage. This magnetism is very peaked and is present in any material degree only during the middle of the corresponding current wave. This is very desirable and allows the rotor to operate by its inertia between two successive magnetic waves. In fact, if the magnetic waves were of sine wave shape the magnetism would at times tend to retard the rotation of the rotor, even though not sufficient to stop or reverse it. It thus becomes clear that if the period of magnetization of the rotor is equal to or less than the period of non-magnetization there will be intermittent drawing of the teeth of the rotor toward the poles. Since now, the rotor $27^1$ tends to rotate at a certain speed by action of the clock mechanism, the action of the magnetic field may either aid or hinder the rotation of the rotor all depending upon whether the rotor teeth are moving toward or away from the stator teeth when the magnetism is a maximum. In this connection it is to be understood that the mass of the rotors 27 and $27^1$ is sufficient to keep the rotor in motion between magnetic impulses exerted by the stator.

It is thus seen that in the arrangement shown in Fig. 1, the gear train driven by the spring 1 is driven, or allowed to progress, at a rate depending on the rate of cycle generation; whereas in Fig. 2 the gear train moves intermittently in step with the escapement wheel $12^1$, but that in this showing of Fig. 2 the torque exerted by the escapement wheel $12^1$ upon the pallet $13^1$ is increased when the wheel $12^1$ rotates slower than the wheel $24^1$, and vice versa.

Although the motors M and $M^1$ in Figs. 1 and 2 are not self starting, it is desired to point out that the associated clocks keep the motors running during power-off periods so that these motors need not be self starting.

As pointed out above, it is proposed to employ the usual spring driven escapement clock mechanism and add suitable means to vary the force exerted to operate the escapement as determined by cycle summation of the current impulses derived from a proper frequency regulated alternating current power system. The additional force exerted on the escapement, when the frequency of the current applied to the synchrous motor is temporarily high and the synchronous motor temporarily runs above its average speed, must of course cause temporary fast operation of the escapement mechanism. This fast operation of an escapement mechanism when increased operating forces are applied thereto is sometimes called "galloping" and is due to the balance wheel 14 bouncing back, so to speak, upon reaching the limit of its arc of movement. This limit of movement of the balance wheel 14 about its pivot in the construction illustrated is due to the pin 17 striking one of the ears $13^a$ of the pallet fork 13. In other words, the balance wheel 14 may rotate only substantially one revolution in each direction from its biased middle position. From this discussion it is apparent that although the escapement illustrated will rather stubbornly control the speed of the gear train when ordinary driving forces, such as that of the main spring 1, are employed, it will operate at excessive speed when an excessive driving force is exerted upon the gear train, and after this excessive force has built up the amplitude of the balance wheel to an extent as limited by pin 17 striking one of the ears 13ª. Also this impacting of the balance wheel upon reaching the end of its stroke causes energy to be absorbed in accordance with the frequency of the alternating current applied to the synchronous motor because increase in the frequency of the alternating current causes the building up of the force exerted by the synchronous motor M upon the escapement mechanism through the medium of spring 21 or 21¹ to cause the amplitude of the balance to become greater and greater, but abnormal and excessive amplitudes are restrained by the limit stops afforded by the pin 17 and 13ª. What has been said about the building up of amplitudes to a limited extent and the absorption of energy in accordance with the frequency of the alternating current in the Fig. 1 structure is likewise true of the Fig. 2 structure. In Fig. 2 the pin and ears mentioned have been designated 17¹ and 13ᵇ, respectively.

Having thus shown and described several specific embodiments of the invention, it is desired to be understood that the specific embodiments have been selected for the purpose of exemplifying the invention and have not been selected for the purpose of showing the exact construction preferably employed or the scope of the invention, and that various changes, modifications and additions may be made to adapt the invention to the particular frequencies and clocks to be used in connection therewith, all without departing from the spirit of the invention, except as demanded by the scope of the following claims.

What I claim as new is:

1. In combination; an escapement clock of the usual construction, including a main spring, a gear train, an escapement and clock hands driven by said gear train; and a synchronous motor connected to said gear train so that it may either exert a driving force upon said gear train or be driven by said gear train.

2. In a maintained-power synchronous electric time-device, the combination with time means; of energy-storing driving-means for the said time-means; a rotary synchronous electric motor-structure constructed and organized in the time device to discharge an electromagnetic braking function on the said energy-storing driving-means; and positive connecting-means between the said synchronous electric motor-structure and the said energy-storing driving-means of such character as will cause the said motor-structure, when current is supplied thereto, to continuously and positively prevent the energy-storing driving-means from driving the said time-means at a rate of speed in excess of a predetermined speed in consonance with the frequency of the sinusoidal electric current supplied to the said motor-structure.

3. A time-device having time-indicating means and driving-means therefor, comprising an electric motor, a power-storage spring energized thereby, and means to transmit power from the spring to the time-indicating means for actuation thereof; in combination with speed-control means independent of the said driving-means and operative to control the speed of the said time-indicating means comprising a constant-speed electric rotary governor coupled to the said time-indicating means in such manner as to positively and continuously limit the speed thereof to a predetermined rate.

4. In a time-keeping device, the combination of a spring motor, a synchronous electric brake and a mechanical speed governor both connected to be driven continuously by said motor and adapted to govern the speed of operation thereof, said synchronous brake being effective to perform its function while current is being supplied thereto and said mechanical speed governor being effective to perform its function only during periods of interruption in the current supply to said synchronous brake.

5. In a time-keeping device, the combination of a motor, a time-keeping mechanism driven thereby, a synchronous electric brake driven by said motor and operatively connected with said mechanism, and a mechanical speed governor operatively connected with said mechanism, said governor having the property of operating at increased speed when driven by an increased force.

6. In a time-keeping device, a source of power of variable magnitude, mechanism driven thereby, a primary and a secondary speed governing means associated with and driven from said mechanism, said primary governing means being operable to maintain the speed of said mechanism substantially constant independently of the driving force applied thereto and said secondary governing means operating at increased speed when subjected to an increased driving force.

7. In a clock, the combination of a gear train having indicating means connected thereto, means for driving said train, and a synchronous motor device supplied with alternating current from a source of regulated frequency and connected to and driven by said train, thereby acting as a brake to limit the speed of operation of said train.

8. In an electrically controlled and operated timing device, the combination of a spring motor, electric motor means to wind said spring motor, gearing driven by said spring motor, and an electromagnetic escapement mechanism driven by said gearing, said escapement mechanism including means maintained in synchronism with a source of alternating current.

9. In combination with an alternating current source of regulated frequency, a time movement, a spring motor in which energy may be stored connected to drive and capable of driving said movement for an appreciable interval of time without attention, a pair of speed governing devices connected to said time movement, one of said devices comprising a non-self-starting synchronous motor energized from said source of supply for maintaining the rate of the time movement correct when the motor is operating at its synchronous speed, the other governing device comprising a mechanical speed checking device, effective when the synchronous motor is de-energized and the spring is in condition to drive the clock, to maintain the average rate of the time movement substantially correct, said mechanical device also serving as means to assist in establishing synchronism of said synchronous motor when it is started.

10. In a time-keeping device, the combination of a motor, a synchronous electric brake and a mechanical speed governor both connected to be driven continuously by said motor and adapted to govern the speed of operation thereof, said governor comprising an oscillatable member, and a yieldable driving connection between said motor and said member.

11. In a time-keeping device, the combination of a motor, a synchronous electric brake driven by said motor, and a balance wheel escapement mechanism driven by said motor, said balance wheel escapement mechanism operating at increased speed when increased power is applied thereto, said synchronous electric brake being operative to control the speed of operation of said motor when supplied with current from an alternating current source, and said balance wheel escapement mechanism being adapted to control the speed of said motor when the supply of current from said source to said brake is interrupted.

12. In a time-keeping device adapted to be operated and have its speed controlled from a source of alternating current, a non-self-starting synchronous motor connected to said source, a mechanical governor, a driving connection between said synchronous motor and said mechanical speed governor, said synchronous motor and governor being interconnected to operate simultaneously at all times, and energy storing means to drive said synchronous motor and governor during the periods of interruption in the supply of current from said source.

13. In a time-keeping device adapted to be operated and have its speed controlled from a source of alternating current, a non-self-starting synchronous motor connected to said source, a mechanical speed governor, said synchronous motor and governor being interconnected to operate simultaneously in substantial synchronism both while current is being supplied from said source and during periods of interruption in the supply of current from said source, and energy storing means to drive said synchronous motor during periods of interruption in the supply of current from said source.

14. In a time-keeping device adapted to be operated and have its speed controlled from a source of alternating current, a synchronous motor connected to said source, a mechanical speed governor, means interconnecting said synchronous motor and governor to cause the same to rotate simultaneously at a predetermined average speed during the time while current is being supplied from said source and during periods of interruption in the supply of current from said source.

15. In a time-keeping device, the combination of a motor, a synchronous electric brake for said motor and which if energized by alternating current will allow said motor to operate at a speed consonant with the frequency of said alternating current, a mechanical escapement for said motor including a shaft rotated at an intermittent varying speed for during the cessation of said alternating current allowing said motor to operate at substantially the same speed, and a yieldable driving connection between said synchronous electric brake and said mechanical escapement.

16. An electric clock including a synchronous motor, time indicating means in conjunction therewith, energy storing means operable independent of the application of power to said synchronous motor, including speed control means, and means for driving said synchronous motor from said energy storing means at substantially synchronous speed during cessations of power.

17. In a sustained-power time indicating system; the combination with energy storing means; a time train driven by said energy storing means; a source of alternating current the frequency of which is regulated to deliver a predetermined number of cycles per unit of time; a timing unit including a magnetic member having a large number of teeth and having a cycle of operation the time period of which is substantially a multiple, greater than one, of the time period of a cycle of said alternating current; said unit being continuously connected to and driven by said time train and in turn, during cessation of alternating current, controlling the rate of operation of said train; and alternating current controlled means acting magnetically upon the teeth of said magnetic member to cause said magnetic member to operate at a rate so that its time period is exactly the said multiple of the time period of a cycle of said alternating current.

18. In a sustained-power time indicating system; the combination with a time shaft; a power distribution system regulated to deliver power at a predetermined number of cycles per unit of time so that cycle delivery manifests the passing of time; a timing unit operated from a local source of power and including a magnetic member having a large number of teeth; said magnetic member having a cycle of operation the time period of which is substantially a multiple, greater than one, of the time period of a cycle of said alternating current; said unit being continuously connected to said shaft and controlling the speed of said shaft, during the cessation of alternating current; and alternating current controlled means acting magnetically upon the teeth of said magnetic member to cause said magnetic member to operate at a rate so that its time period is exactly the said multiple of the time period of a cycle of said alternating current.

19. In a maintained-power synchronous electric time-device, the combination with time means; of energy-storing driving-means for the said time-means; a synchronous electric governor; connecting-means between the said synchronous electric governor and the said energy-storing driving-means of such character as will cause the said governor, when current is supplied thereto, to continuously resist the driving urge of the said driving-means and normally prevent the latter from driving the said time-means at a rate of speed other than that in consonance with the frequency of the sinuous electric current supplied to the said governor; and retarding-means also coupled to the said time-means for retarding the movement thereof under the urge of the said energy-storing driving-means when the said synchronous electric governor is inoperative due to a failure in the current supplied thereto.

20. An electric motor mechanism comprising a synchronous electric motor, a spring motor, means for driving said synchronous motor from said spring motor during interruptions of current to said electric motor, and speed control means for said motors; said speed control means including means for automatically varying the energy absorbed by said speed control means in accordance with the frequency of the current applied to said electric motor.

21. In a clock, the combination of an escapement mechanism comprising an escapement wheel, a pallet fork, a balance wheel and a hair spring, a synchronous electric motor, means controlled by said motor for controlling the oscillations of said balance wheel, and automatically operating secondary means for restraining certain abnormal amplitudes of oscillations of said balance wheel caused by said controlling means.

22. In a clock, the combination of an escapement mechanism comprising an escapement wheel, a pallet fork, a balance wheel and a hair spring, a synchronous electric motor, means actuated by said motor for controlling the oscillations of said balance wheel, and stop means functioning automatically to increase the frequency of said balance wheel when under certain abnormal conditions of operation of said balance wheel the amplitude thereof is increased to a predetermined degree 23. In a clock, the combination of an escapement mechanism comprising a balance wheel, said wheel having a projection thereon, a synchronous electric motor, means actuated by said motor for controlling the oscillations of said balance wheel, and a bumper adapted to be engaged by said projection on the balance wheel when the amplitude of motion of said wheel is maintained beyond a predetermined degree by said oscillation controlling means.

24. In a clock, the combination of an escapement mechanism comprising a pallet fork and a balance wheel, a synchronous electric motor, means actuated by said motor for controlling the oscillations of said balance wheel, and reacting means coacting between said pallet fork and said balance wheel for modifying certain abnormal amplitudes of oscillations of said wheel caused by said motor actuated means.

25. A timing device, a main spring for operating said device, an escapement driven by said device, said escapement being of a type having a slightly decreasing rate of operation as the force applied thereto decreases, a synchronous motor associated with said device, means for comparing the relative rates of operation of said device as controlled by said escapement and said motor, comprising rotating parts having the same axis of rotation and driven respectively by said device and motor in the same direction and at the same rate of speed when the device and motor are operating at their correct rates, one of said parts being resilient and projecting into the path of movement of the other part whereby, when not rotating at the same rate, energy is transferred between said parts by an amount and in a direction to correct the rate of said escapement as compared to the rate of the synchronous motor.

26. In a time-keeping device, the combination of driving means, an electric synchronous brake driven thereby, said brake having a rotor, a mechanical speed governing mechanism having a rotating part, said mechanism operating while said synchronous brake is effective to retard said driving means, and a resilient driving connection between said rotor and said rotating part.

27. An electric clock including a synchronous motor and time manifesting means governed thereby, rotatable means operable independently of the application of power to said synchronous motor and rotated from a local source of energy at substantially constant average speed when free of extraneous forces, and means for driving said synchronous motor by said rotatable means at substantially the average synchronous speed of said synchronous motor during cessations of power.

OSCAR H. DICKE.